United States Patent [19]
Braun

[11] Patent Number: 6,086,074
[45] Date of Patent: Jul. 11, 2000

[54] STEERING LOCK SYSTEM

[75] Inventor: Eric E. Braun, Neenah, Wis.

[73] Assignee: Oshkosh Truck Corporation, Oshkosh, Wis.

[21] Appl. No.: 08/746,685

[22] Filed: Nov. 14, 1996

Related U.S. Application Data

[60] Provisional application No. 60/006,770, Nov. 15, 1995.

[51] Int. Cl.[7] .................................................. B62D 15/00
[52] U.S. Cl. ........................ 280/89.11; 280/89; 280/89.1
[58] Field of Search .................................. 280/89, 90, 94, 280/149.2, 89.11, 89.1; 180/24.01; 70/225, 226, 237, 252

[56] References Cited

U.S. PATENT DOCUMENTS

| | | | |
|---|---|---|---|
| 693,962 | 2/1902 | Fox et al. | 280/94 |
| 1,449,907 | 3/1923 | Lumley | 280/94 |
| 1,750,599 | 3/1930 | Holmes et al. | 280/89 |
| 1,760,935 | 6/1930 | Burdette | 280/89 |
| 2,182,596 | 12/1939 | Olsen | 74/495 |
| 2,448,468 | 8/1948 | Ross | 280/90 |
| 4,958,845 | 9/1990 | Parks | 280/149.2 |
| 5,111,901 | 5/1992 | Bachhuber et al. | 180/140 |
| 5,417,299 | 5/1995 | Pillar et al. | 180/140 |

FOREIGN PATENT DOCUMENTS

| | | | |
|---|---|---|---|
| 3-167078 | 9/1991 | Japan | 280/89 |
| 61586 | 10/1939 | Norway | 280/89 |

Primary Examiner—Eric D. Culbreth
Attorney, Agent, or Firm—Baker & McKenzie

[57] ABSTRACT

A steering lock mechanism for a steerable axle assembly. The mechanism includes a fluid-actuated pin mounted within a cylinder. The cylinder is carried by a plate attached to a steerable wheel end. The pin carried by the cylinder has a tapered end which engages a tapered hole. When these tapered components are in engagement, steering motion of the steerable wheel end is prevented. The mechanism has several significant features, one of which is a fail-safe design in which a mechanical spring urges the pin to assume an extended or locking position in the event of failure of the pneumatic actuating system. The mechanism is designed so that the pin will find the hole as the steered wheels sweep past the straight ahead position, in the event of a failure of the fluid actuation system used to retract the pin. A second feature is an adjustability afforded by 1) the pin being eccentrically mounted within a rotatable supporting cylinder; and 2) the tapered hole for receiving the pin being mounted in a slidable block which can be brought into alignment with the pin after the steerable wheels have been put into a straight ahead position.

10 Claims, 2 Drawing Sheets

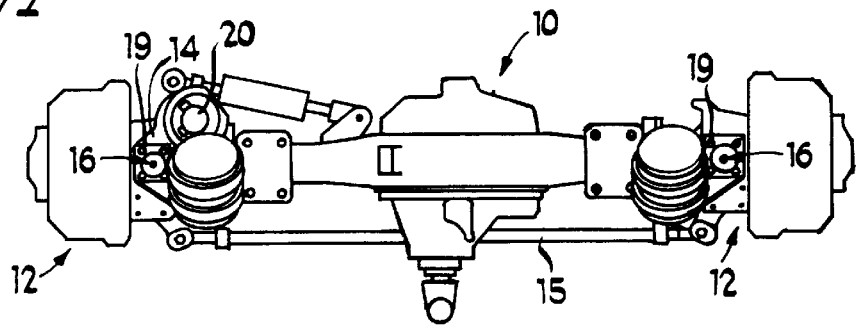
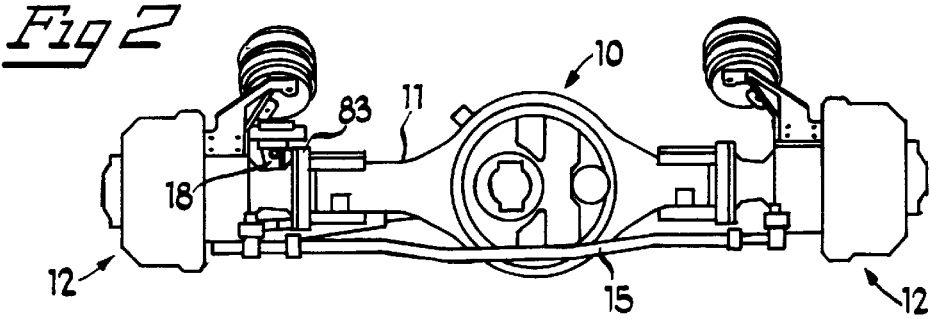
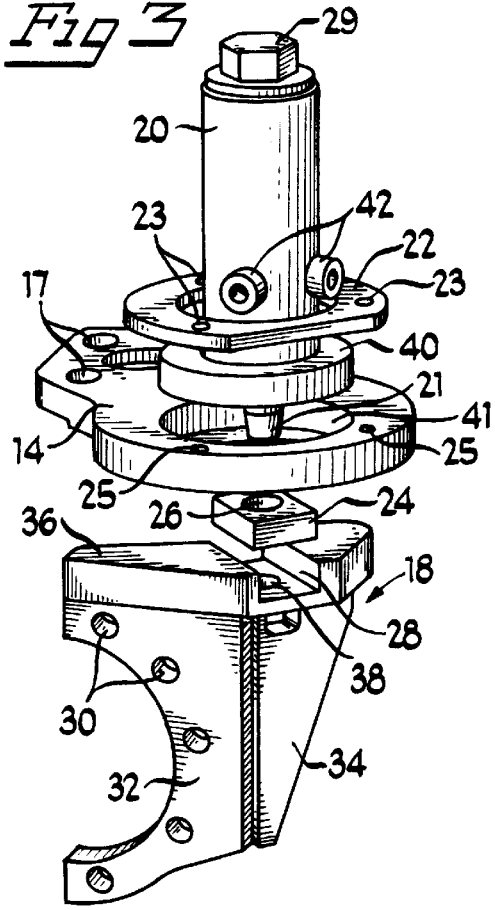
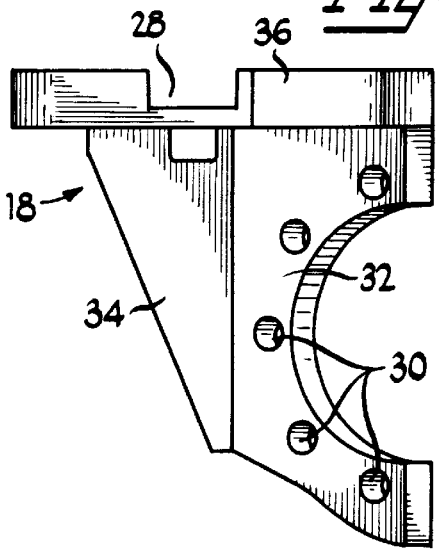
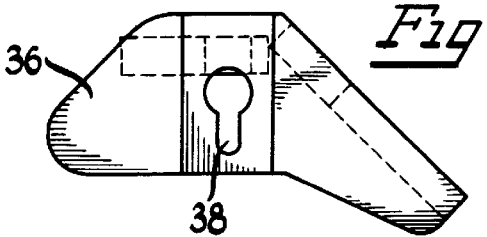

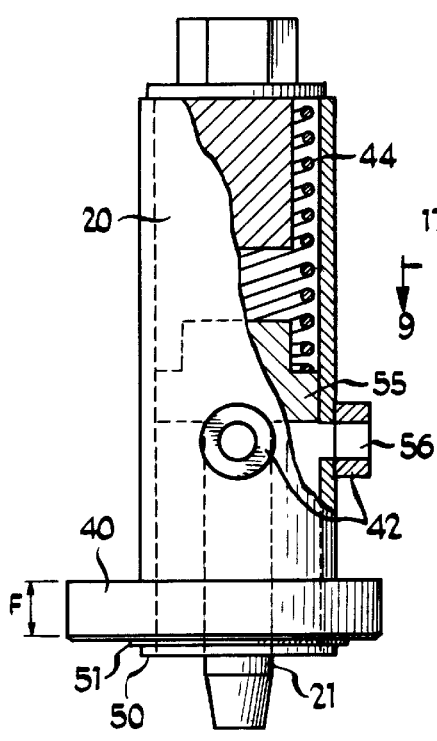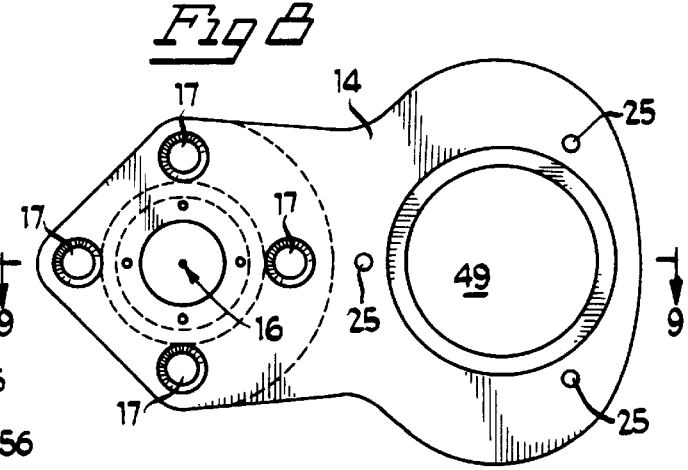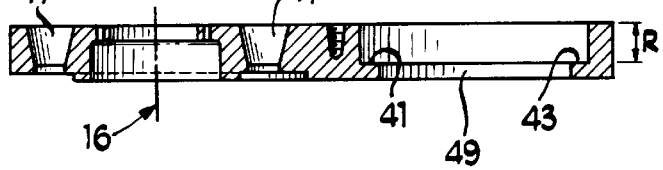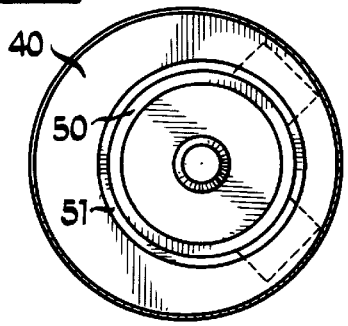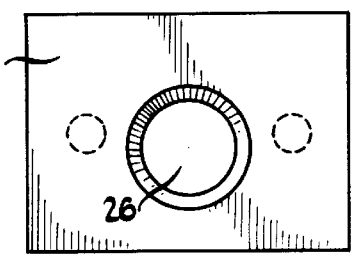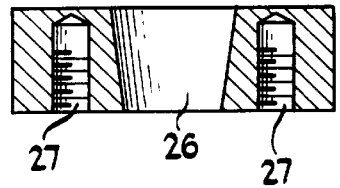

STEERING LOCK SYSTEM

This application claims the benefit of U.S. Provisional Application No. 60/006,770, filed Nov. 15, 1995.

BACKGROUND AND SUMMARY OF THE INVENTION

This invention relates generally to steering systems, and in particular, it relates to locking mechanisms for alternatively allowing and preventing the steering motion of wheels in an axle assembly. The invention has particular application in vehicles in which the rear wheels of the vehicle are steerable. In such vehicles, it is important, for safety purposes, to limit the steerability of the rear wheels when the vehicle reaches a certain level speed.

It is desirable for some vehicles, such as fire trucks and other large and special purpose vehicles, to have what is referred to as "all-wheel" steering. Examples of such systems are shown in significant detail in a number of patents, such as U.S. Pat. Nos. 5,417,299 and 5,111,901, both of which patents are assigned to the assignee of this invention and which are incorporated herein by reference.

Making the rear wheels of a steerable vehicle presents certain problems. For example, when the rear wheels are intended to be fixed, and not steerable, it is important that they be held rigidly in place, i.e. that they be play-free. In addition, when the wheels are placed in the locked and non-steerable condition, it is important that the wheels be aligned so that they are parallel with the longitudinal axis of the wheel. This is important so that when the front wheels are pointed straight ahead, the rear wheels will also be pointed straight ahead. Otherwise, the vehicle will proceed forward on an angle, sometimes referred to as "dog-tracking".

Another important consideration in the design of all-wheel steering systems is the prevention of inadvertent movement of the rear wheels, particularly at high speed. Even small amount of steering movement of the rear wheels of a vehicle, when the vehicle is proceeding at a high rate of speed, can cause the vehicle to overturn. Similarly, if there is any significant play in the steering motion of the rear wheels when the wheels are intended to be locked and non-steerable, can make it difficult to control the direction of the vehicle. This is due in part to the significant affect that a small amount of steering motion of the rear wheels can have on the direction of movement of the vehicle at high speeds.

Also, the presence of any significant amount of play can cause serious problems if the vehicle should happen to vibrate as a result of such play. This problem may arise at a particular speed at which the vehicle is driven, or when the vehicle is being towed with only the rear wheels in contact with the ground.

It is an object of the present invention to provide a locking mechanism for a steerable axle assembly in which play in the system is minimized or substantially eliminated.

It is another object of the present invention to provide a locking mechanism for a steerable axle assembly in which the mechanism has a fail-safe feature in which the lock is normally in the locked position.

Still another object of the present invention is to provide a locking mechanism for a steerable axle assembly which upon installation and at other times can be quickly and inexpensively adjusted so that the steerable wheels are pointing forward when the mechanism is in the locked position.

Yet another object of the present invention is to provide a locking mechanism for a steerable axle assembly in which there is little or no opportunity for the vehicle to vibrate when the mechanism is in the locked position, whether the vehicle is being operated under its own power or being towed.

Still another object of the invention is to provide a locking assembly which will, when actuated while the wheels are in a turned position, cause the lock to become engaged as soon as the wheels are returned to the straight ahead position.

The objects and advantages of the present invention are achieved with a steering lock assembly which includes a fluid-operated cylinder in which a moveable pin has been mounted. The pin has a tapered end which fits into a matching tapered hole when the mechanism is locked. A mechanical coil spring urges the pin into a locked position, and pressurized fluid, such as air, is used to move the pin out of the tapered hole to an unlocked position when steerability of the wheels of the assembly is desired. The coil spring ensures that if power in the vehicle is lost or interrupted, resulting in inability of the fluid system to act upon the pin, the spring will urge the pin in the direction of the tapered hole so that when the wheels are moved to the straight-ahead position, the mechanism automatically locks the wheels and prevents further steering motion of the wheels. In a preferred form of the invention, the tapered hole is formed in a sliding block supported by an anchor bracket, and the pin is held by a cylinder which moves in an arc as the wheels are turned. The pin is eccentrically mounted in the supporting cylinder, so that the combination of the rotation of the cylinder and movement of the sliding block provide ample adjustability in the relative positions of the main contact points of the locking mechanism.

In the preferred form of the invention shown herein, the pin and cylinder assembly is rigidly attached to the moveable wheel end of the steerable axle assembly, and the sliding block, in which is formed the tapered hole, is fixed to an anchor bracket mounted to a fixed or non-steerable portion of the steerable axle assembly.

The objects of the invention, as discussed above, and other aspects and advantages of the present invention, will be better understood upon a reading of the following specification, read in conjunction with the accompanying drawings.

BRIEF DESCRIPTION OF THE DRAWINGS

For a detailed description of the preferred embodiment of the present invention, references should be made to the accompanying drawings wherein:

FIGS. 1 and 2 are top and front elevational views, respectively, of a steerable axle assembly made in accordance with the present invention.

FIG. 3 is an exploded perspective view of the steering lock mechanism of the present invention.

FIG. 4 is a side elevational view of an anchor bracket which forms a part of an embodiment of the present invention.

FIG. 5 is a top plan view of the anchor bracket shown in FIG. 4.

FIG. 6 is a side elevational view of a cylinder which is used in connection with the embodiment of the present invention.

FIG. 7 is an end view of the cylinder shown in FIG. 6.

FIG. 8 is a plan view of an upper plate used to support the cylinder shown in FIGS. 6 and 7.

FIG. 9 is a cross-sectional view of the plate shown in FIG. 8 taken along lines 9—9 of FIG. 8.

FIGS. 10 and 11 are plan and cross-sectional views of the sliding block shown in FIG. 3.

DETAILED DESCRIPTION OF AN EMBODIMENT OF THE INVENTION

To provide a frame of reference for the present invention, FIGS. 1 and 2 are a top plan and a front elevational view of an axle assembly 10 of the type in which the present invention has application. A moveable wheel end 12 rotates about a king pin axis 16. Similarly, at the other end of the axle assembly 10, a second moveable wheel end 12' rotates about a second king pin axis 16". As would be the case in many steerable axle assemblies, a tie rod 15 is used to link the two wheel ends 12.

The plate 14, shown in more detail in FIGS. 3, 8 and 9, can be seen on the left side of FIG. 1. The plate 14 is held in place by four bolts 19. The right side of FIG. 1 shows four similar bolts 19' which may be used to support plate 14 in the event that it is desired to attach the locking mechanism of the present invention to the right side (as seen in FIGS. 1 and 2) of the axle assembly 10 instead of the left side as shown herein.

FIG. 3 shows the arrangement of several components used to construct a steering lock mechanism in accordance with the present invention. An air cylinder 20 is mounted to the upper plate 14, and in particular, the flange 40 at the base of the cylinder 20 fits into a recess 41 in the upper plate 14. Fittings 42 are arranged at two locations along the outside housing of the air cylinder 20. Two such fittings are used so that, depending upon the rotational position of the cylinder after installation and rotational adjustment, ready access may be gained to provide a source of pressurized air to the interior of the cylinder 20. A clamp plate 22 is used to hold the flange 40 in the recess 41. Three holes 23 are arranged to align with three tapped holes 25 formed in the upper plate 14. As the clamping plate 22 is fastened by bolts (not shown) to the plate 14, the flange 40 is held in the recess 41. For purposes of adjusting the rotational position of the air cylinder 20, the bolts extending through the aperture 23 may be slightly loosened and torque may be applied to the nut-like formation 29 located at the upper end of the cylinder 20. A pin 21 with a tapered end extends from the lower end of the cylinder 20. Pressurized air applied through either of the fittings 42 will result in retraction of the pin 21 to a position whereby it is substantially entirely within the interior of the cylinder 20. When so retracted, the pin 21, cylinder 20 and plate 14 may move freely with the rotation of the wheel end 12 about the king pin axis 16.

When pressure is not applied to the cylinder 20, a spring 44 inside the cylinder 20 (see FIG. 6) urges the pin 21 downward to an extended position in which the tapered end of the pin 21 engages a tapered hole 26 in the sliding block 24. The block 24 is moveable along the axis of the channel 28 formed in the slide plate 36. However, the block 24 is moveable in directions substantially radially inward and outward towards and away from the king pin axis 16, and the block 24 is substantially immoveable in the arc defined by the movement of the pin 21 about the king pin axis 16. The anchor bracket 18 of which the slide plate 36 is a main component also includes a vertical plate 32 with apertures 30 which enable the anchor bracket 18 to be mounted to the flange 83 (see FIG. 2) which is part of the fixed portion of the assembly 11. The anchor bracket 18 also includes a gusset 34 which provides stability to the slide plate 36, and helps to absorb stabilizing forces applied to the slide block 24 when the mechanism of the present invention is in the locked position.

FIGS. 4 and 5 are elevational and end views respectively of the anchor bracket 18. The key hole 38 formed in base of the channel 28 is located so that the wide portion of the keyhole 38 is generally in alignment with the tapered hole 26 to prevent the accumulation of any debris or dirt which might otherwise inhibit the engagement of the pin 21 in the tapered hole 26. The narrow portion of the key hole 38 is intended to allow a fastener (not shown) to be used to hold the slide block 24 (see FIG. 3) in a predetermined position after adjustment of the block 24, while allowing the location of the slide block 24 to be adjusted along the length of the channel 28. The fastener used to hold the slide block 24 in the channel 28 will extend from the underside of the slide plate 36 through the narrow portion of the key hole 38 and into one of the two tapped holes 27 shown in FIG. 11 which are on opposite sides of the tapered hole 26 formed in the block 24. The apertures 30 in the vertical plate 32 are used, along with bolts (not shown), to facilitate the attachment of the anchor bracket 18 to the flange 83 which is located at one end of the fixed portion 11 of the axle assembly 10 (see FIG. 2).

FIGS. 6 and 7 are elevational and end views, respectively, of the air cylinder 20 which is a component in a preferred embodiment of the invention. The partial section in the upper portion of FIG. 6 shows a coil spring 44 which is used to urge the pin 21 to its extended position, which is shown in FIG. 6. The cylinder 20 is designed such that the normal or unpressurized and at rest condition of the cylinder results in the pin 21 assuming the extended position. This arrangement allows the locking mechanism to operate in a fail safe manner. Thus, if the source by which pressurized air is supplied by the cylinder should happen to fail, or if some other failure should occur unexpectedly, the cylinder 20 will urge the pin to its extended position, and when the wheels are turned to the straight ahead position, the pin 21 will engage the tapered hole 26 resulting in the locking of the steerable wheels. The operation of the cylinder 20 can be seen from FIG. 6. When the pin 21 is in its extended position as shown in FIG. 6, the coil spring 44 engages a plug 55 which is integral with pin 21 and thereby the coil spring 44 urges the pin 21 to its extended position. When pressurized air enters passageway 56 in fitting 42, the air pressure contacts plug 55 whereby forces exerted on the plug 55 by the coil spring 44 are exceeded thereby resulting in the movement of the plug 55 toward the top of the cylinder and therefore, retraction of the pin 21.

FIGS. 8 and 9 show the details of the plate 14. Four holes 17 are spaced evenly about the king pin axis 16, about which the wheel end and components attached to the wheel end rotate. As discussed above, the apertures 23 receive threaded fasteners which are used in combination with the clamping ring 22 to hold the cylinder 20 in position. As can be seen by comparing FIGS. 6 and 9, the height F of the flange 40 at the base of the cylinder 20 is greater than the height R of the recess 41 in the upper plate 14. By dimensioning these components in this manner, tightening of the clamping ring 22 will ensure a tight abutting and frictional relationship between the underside of the flange 40 and the shoulder 43 at the base of the recess 41. The presence of the shoulder 43 results in the aperture 49 in the plate 14 having two diameters, a larger upper diameter and a smaller lower diameter. The larger upper diameter is shaped to substantially match the diameter of the flange 40 at the base of the cylinder 20, so that the flange 40 can rotate in close fitting relationship within the recess 41. However, the smaller diameter portion of the aperture 49 is designed to accommodate the nose portions 50 and 51 at the lower end of the cylinder 20, as shown in FIG. 7. Also in FIG. 7, it can be seen that flange 40 is arranged on the cylinder 20 such that the flange 40 and the cylinder 20 are eccentric, i.e., the centerpoint of the flange 40 and the centerpoint of the cylinder 20 are not the same. Because of this arrangement of the flange 40 on the cylinder 20, rotational adjustment of the cylinder 20 within the recess 41 will cause the nose portions 50 and 51 to assume various positions, and therefore, the diameter of the smaller portion of the aperture 49 should be substantially larger than the diameter of the larger nose portion 51.

FIG. 10 shows the tapered hole 26 being located just off the longitudinal axis of the block 24. This arrangement provides an additional margin of adjustability to the combination of the block and pin. If during adjustment of the wheels to the straight ahead position, and the subsequent adjustment of the cylinder and block, result in the block extending an inordinate amount from one end of the channel 28, the position of the block 24 in the channel 28 can be changed by rotating the block 180°. This will result in an alternative position for the block 24 which may be preferable to the original position of the block within the channel 28.

FIGS. 10 and 11 depict the sliding block 24 shown in FIG. 3. The tapered hole 26 extends entirely through the block 24. The tapped holes 27 are formed on the underside of the block 24, and are used to hold the block 24 in position once final adjustment has been determined. A fastener (not shown), preferably a single fastener, is used to hold the block 24 at a predetermined position along the channel 28 (see FIG. 3) by extending through the narrow portion of the slot 38 (see FIG. 5) and into one of the apertures 27.

One of the advantageous aspects of the locking mechanism of the present invention is the ability to quickly achieve straight ahead alignment of the steerable wheels, and to set the locking mechanism so that the straight ahead position is achieved when the steering mechanism is in the locked position. Alignment of the wheels of a steerable vehicle using the locking mechanism of the present invention is achieved by using the following steps:

First, the three small fasteners which extend through the apertures 23 into the tapped holes 25 and which hold the clamp ring 22 against the flange 40 are loosened. In addition, the fastener which holds the sliding block 24 in position within the channel 28 is loosened. With these components loosened, a mechanic can then apply torque to the hexagonal end 29 of the cylinder 20. Rotation of the cylinder 20 with the pin 21 engaged in the tapered hole 26 results in rotational adjustment of the position of the wheel end 12 about the king pin axis 16. By moving the cylinder 20 rotationally, the eccentricity of the pin 21 forces the upper plate 14 to rotate about the king pin axis 16, so that the cylinder 20 may be used to adjust the position of the steered wheels. It is important to note that during this adjustment, the pin 21 must be engaged in the tapered hole 26.

It should be noted that the height of the block 24 is preferably made to match the depth of the channel 28 so that the upper surface of the slide plate 36 and the upper surface of the block 24 are in substantial alignment when the installation of the lock mechanism is completed. By dimensioning these components in this manner, a substantially smooth surface will be formed so that in the event of a failure of the pneumatic system used to operate the cylinder 20, the pin 21 will readily find the tapered hole 26 as steering of the steered wheels causes the pin 21 to sweep in an arc over the tapered hole 26. It should also be noted that the size and shape of the upper surface of the slide plate 36 is sufficient to engage the pin 21 in the event of such loss of pneumatic power, even if such loss occurs when the steered wheels are in a position of maximum deflection or deviation from the straight ahead position. Another aspect of the embodiment shown herein which contributes to the fail-safe aspects of the invention is the particular taper used on the free end of the pin 21 and the matching taper of the tapered hole 26. These tapered components have what is referred to as a "steep machine taper", sometimes called a "self-releasing taper", preferably approximately 3.5 inches per foot. This amount of taper allows for both easy locking and releasing, while providing adequate load holding in the event that substantial lateral loads are applied to the pin when it is engaged in the tapered hole.

While a specific embodiment of the invention has been shown and described, it will be apparent to those skilled in the art that numerous alternatives, modifications, and variations of the embodiment shown can be made without departing from the spirit and scope of the appended claims.

I claim:

1. A lock mechanism for controlling steering motion of wheels in an axle assembly having a pair of moveable wheel ends, the lock mechanism comprising a pin moveable between a first position and a second position, and a support having a hole for receiving said pin, said pin being carried by one of said moveable wheel ends and said support being carried by a fixed portion of said axle assembly, wherein said first position is one in which said pin is in engagement with said hole, and said second position is one in which said pin is withdrawn from said hole, and wherein said pin is actuated by a cylinder in which a spring urges said pin toward said first position whereby said pin is normally in said first position, and pressurized fluid urges said pin to said second position whereby forces exerted upon said pin by said spring are exceeded resulting in retraction of said pin from said hole.

2. A lock mechanism in accordance with claim 1 wherein:
said pin is housed in said cylinder and said cylinder has an eccentrically mounted flange, whereby rotation of said cylinder causes adjustment of said pin about a central axis of said flange.

3. A lock mechanism in accordance with claim 2 wherein:
said cylinder and said pin form a locking pin assembly and said locking pin assembly is mounted to a plate, said plate being attached to a steerable portion of said axle assembly whereby said locking pin assembly moves in unison with said wheels as said wheels are steered, and said support is carried by a fixed and non-steerable portion of said axle assembly.

4. A lock mechanism in accordance with claim 1 wherein:
said mechanism includes means for adjusting the relative positions of said pin and said hole, whereby alignment of said wheels may be achieved upon engagement of said pin and said hole.

5. A lock mechanism in accordance with claim 4 wherein:

said means for adjusting includes means for moving said pin relative to portions of said axle assembly which support said pin.

6. A lock mechanism in accordance with claim 5 wherein:

said means for moving said pin includes a recess in said plate into which a flange on said cylinder fits, a clamp ring holding said flange in said recess, and eccentricity of said flange with respect to said cylinder, whereby rotation of said cylinder causes displacement of said pin.

7. A lock mechanism in accordance with claim 4 wherein:

said means for adjusting includes means for changing the position of said hole relative to portions of said axle assembly which carry said hole.

8. A lock mechanism in accordance with claim 7 wherein:

said means for changing the position of said hole comprises a block in which said hole is formed, said block fitting into and being slideable in a channel, said channel being formed in the support.

9. A lock mechanism in accordance with claim 8 wherein:

upper surfaces of said support adjacent to said channel are generally even with a top surface of said block, said upper surfaces and said top surface enabling said pin to move across said upper and top surfaces and allowing said pin to enter said hole after said pressurized fluid ceases to urge said pin to said second position and as soon as said wheels are pointing straight ahead.

10. A lock mechanism in accordance with claim 4 wherein:

said means for adjusting include means for moving both said pin and said hole relative to the respective portions of said axle assembly which carry said pin and said hole.

* * * * *